United States Patent Office 3,715,135
Patented Feb. 6, 1973

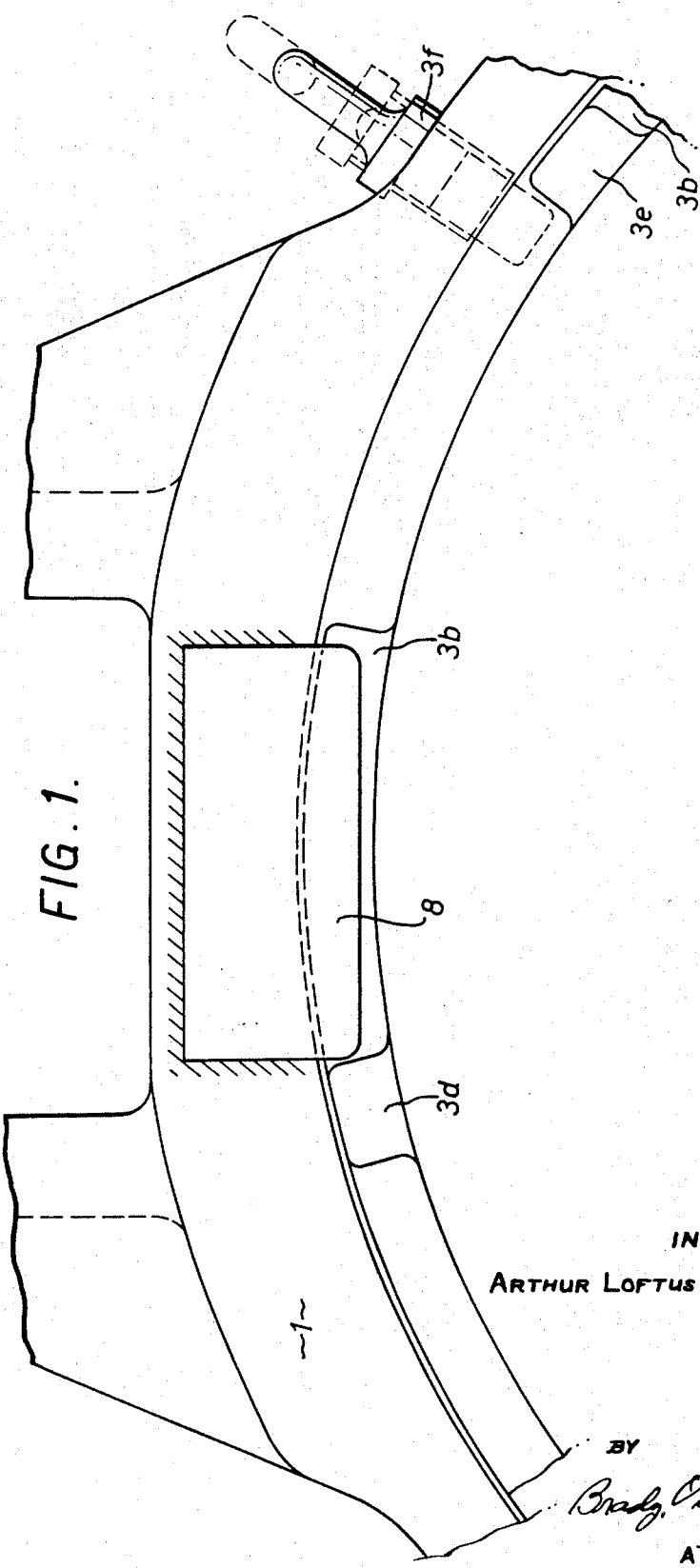

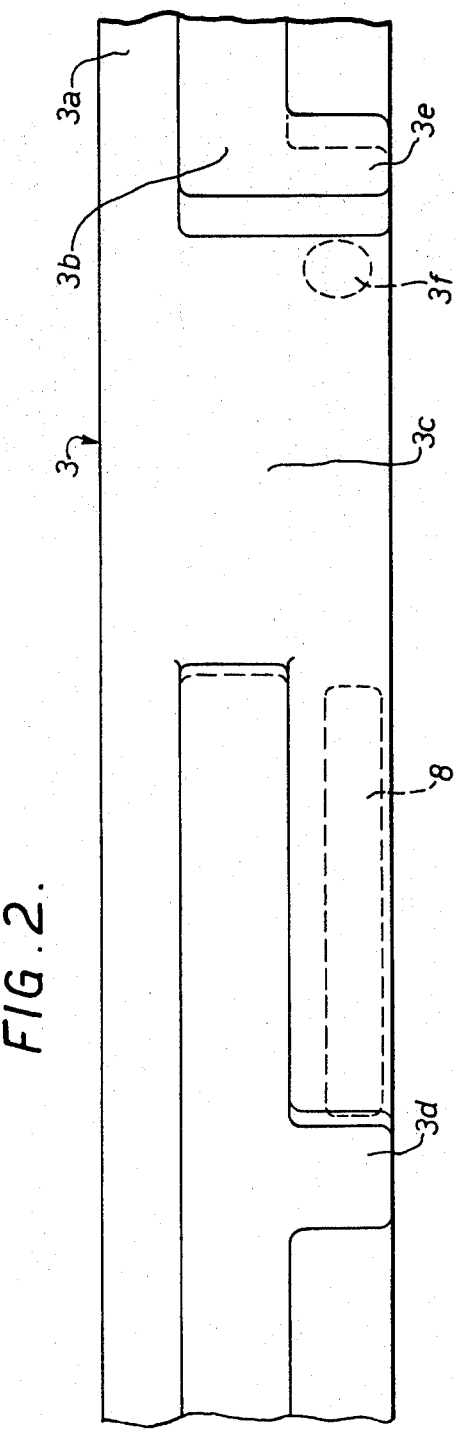

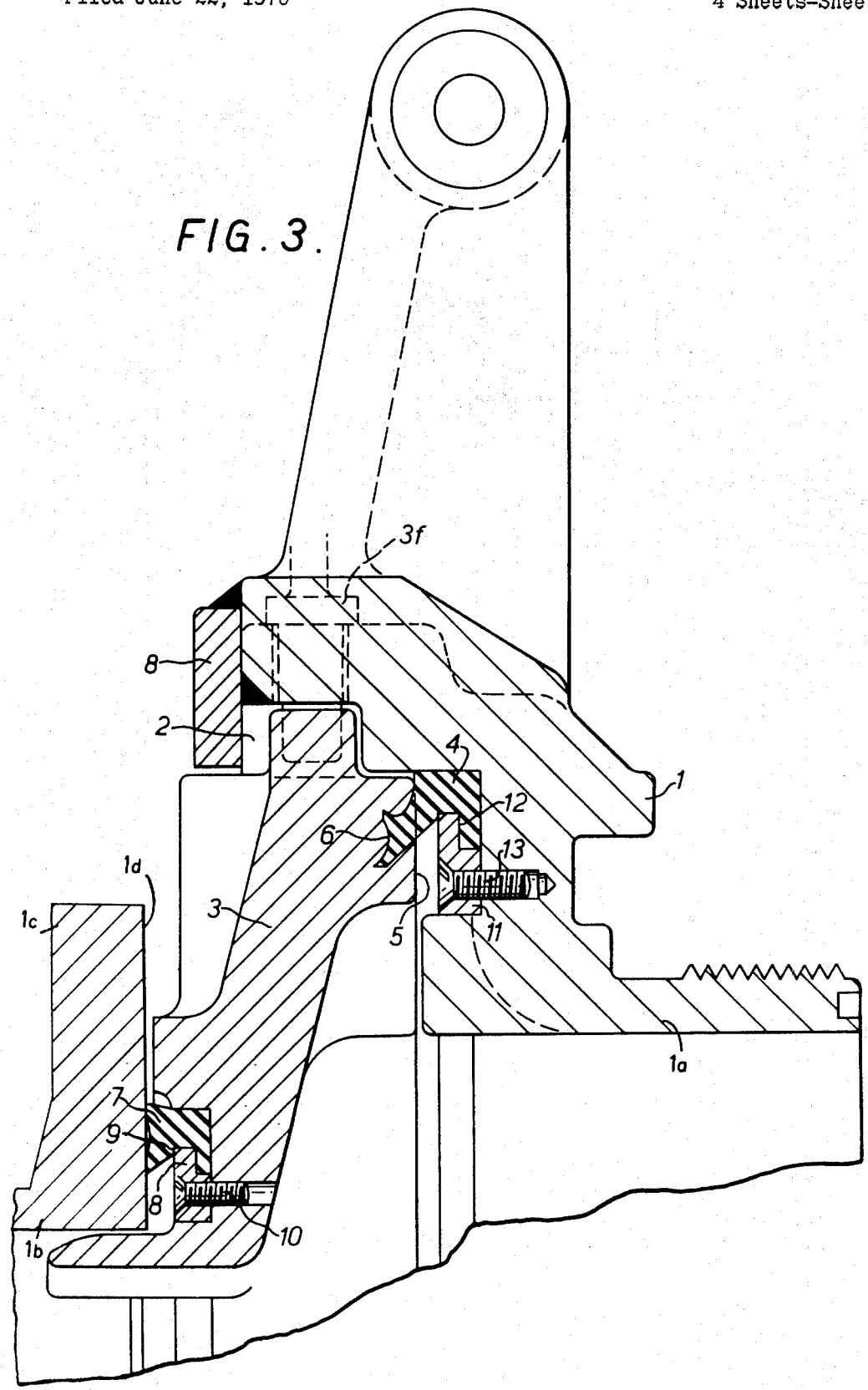

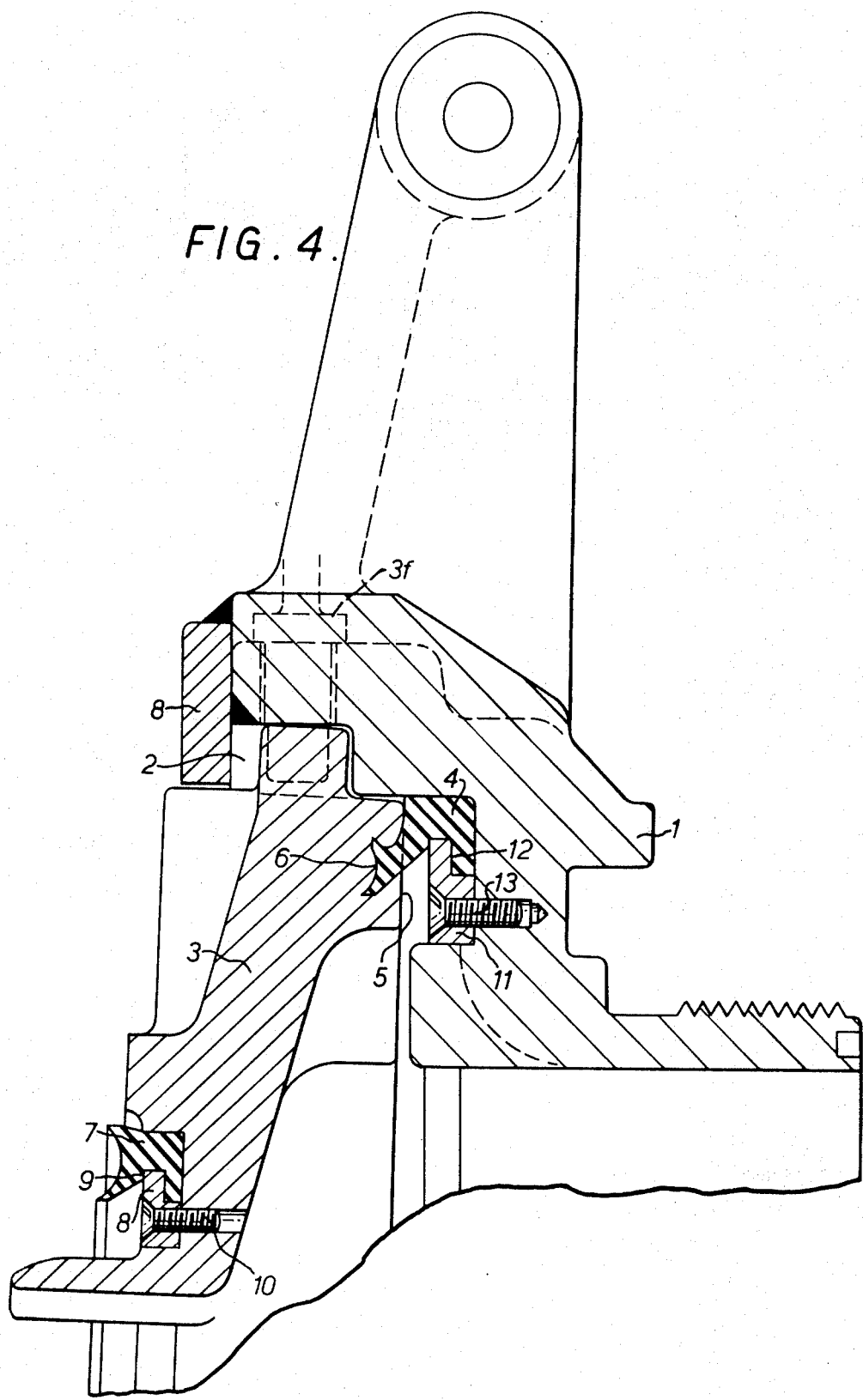

3,715,135
SEALING MEANS FOR PIPES
Arthur Loftus Paddington, Radbrooke, England, assignor to British Ropes Limited, Doncaster, Yorkshire, England
Filed June 22, 1970, Ser. No. 48,211
Claims priority, application Great Britain, July 2, 1969, 33,488/69
Int. Cl. F16l 17/00
U.S. Cl. 285—379                                  7 Claims

ABSTRACT OF THE DISCLOSURE

Sealing means for providing a fluidtight connection between two pipe sections. The sealing means comprises an annular housing arranged to be secured to one of the pipe sections, a floating ring mounted loosely in an annular recess in the housing so as to be capable of limited radial and axial movement relative thereto, and a resilient annular sealing member between the housing and the floating ring. The floating ring is arranged to make sealing contact with the other pipe section and, by virtue of its ability to move radially and axially relative to the housing, it can compensate for misalignment between the two pipe sections.

---

The invention relates to means for providing a fluidtight seal between a pair of hollow members, for example a pair of pipes, and it is an object of the invention to provide such means which can compensate for misalignment between the two hollow members.

According to the invention, sealing means for providing a fluidtight connection between a pair of hollow members comprises an annular housing arranged to be secured to one of the hollow members, a floating ring mounted in the housing for limited radial and axial movement relative thereto and arranged to make sealing contact with the other of the hollow members, and a resilient annular sealing member between the housing and the floating ring.

Preferably said sealing member is carried by the housing.

Preferably the floating ring is loosely mounted in an annular recess in the housing.

Advantageously the floating ring includes a further resilient annular sealing member arranged to contact the other of the hollow members so as to seal the floating ring to the said other hollow member.

The invention also provides a pipe coupling comprising two pipe sections joined together in a fluidtight manner, in which a sealing means between the two pipe sections comprises an annular housing secured to one of the pipe sections, a floating ring mounted in the housing for limited radial and axial movement relative thereto and arranged to make sealing contact with the other of the pipe sections, and a resilient annular sealing member between the housing and the sealing ring.

The housing may be formed integrally with said one pipe section.

The invention will now be particularly described with reference to the accompanying drawings in which:

FIG. 1 is a front view of part of a device according to the invention;

FIG. 2 is a plan view of one part of the device shown in FIG. 1;

FIG. 3 is a cross-section through the device shown in FIGS. 1 and 2; and

FIG. 4 is a cross-section corresponding to FIG. 3 with the floating ring displaced to allow for misalignment.

In the drawings there is shown sealing means arranged to be disposed between two hollow members 1a, 1b in the form of a pair of pipes (FIG. 3) to be connected together so as to provide a fluidtight joint between the pipes. The sealing means comprises an annular housing 1 arranged to be secured to pipe 1a, the housing having an annular inwardly facing recess 2 in which is arranged a floating ring 3. The recess 2 is slightly larger than the ring 3 so that the ring can move radially and axially to a limited extent relative to the housing.

As shown in FIG. 2 the floating ring comprises a body portion 3a formed with a centrally disposed radially outwardly projecting annular flange 3b. The flange 3b is formed with cutaway portions 3c, one of which is shown in FIG. 2. A pair of axial projections 3d, 3e is associated with each cutaway portion 3c and they join the flange 3b with one edge of the floating ring.

The ring 3 is retained in the housing by means of retainer plates 8 fastened to the housing. The ring is positioned in the housing by aligning the plates 8 with the cutaway portions 3c in the flange 3b of the ring and then moving the ring axially into the recess 2. The ring can then be rotated until the plates 8 are behind the flange 3b and abut against the projections 3d on the ring to prevent axial displacement of the ring from the housing. To prevent unintentional rotation of the ring 3 into a release position, at least one radially-adjustable screwthreaded retaining bolt 3f is provided in the housing engageable with the associated projection 3e.

The ring carries an annular sealing member 7 of an elastomeric material which is secured to the ring by means of an annular member 8 fitting into a groove 9 in the sealing member 7 and secured by bolts 10 to the ring 3. The member 7 is arranged to contact a radial end surface, e.g. a flange 1c, on the second pipe 1b of the pair of pipes to be joined.

A resilient annular sealing member 4 of elastomeric material is secured in the housing by means of an annular member 11 fitting into a groove 12 in the sealing member 4 and secured by bolts 13 to the housing 1. The sealing member 4 has a resilient lip 6 which is arranged to make sealing contact with a radial surface 5 of the ring 3 irrespective of the position adopted by the ring in the housing. For illustrative purposes only, the sealing members 4 and 7 are shown undistorted. However, in practice, the lips 6 and 7 will be distorted by the ring to lie in sealing engagement with the surfaces and 1d, respectively.

The arrangement shown in FIG. 4 is the same as that shown in FIG. 3 except that the ring 3 is tilted to allow for misalignment of pipes being coupled.

In operation the housing 1 of the sealing means is connected to the end of one of the pair of pipes 1a to be joined or is formed integrally therewith as shown in FIG. 3 and the end of the other pipe 1b is then arranged to abut the annular sealing member 7. The two pipes are then moved towards one another to clamp the sealing means between the ends of the two pipes. The pipe 1b includes a flanged end surface 1d which abuts against the member 7 to seal the pipe 1b to the ring 3. Suitable clamping means are provided for connecting the housing 1 to the flanged pipe 1b so as to fix the two pipes together. As the ring 3 can move relative to the housing misalignment between the ends of the pipes can be accommodated by the sealing means. The fluid seals afforded by members 4 and 7 ensure that fluidtight joints are provided between the various interconnected members even although the ends of the pipes are not precisely aligned.

I claim:
1. Sealing means for providing a fluidtight connection between a pair of hollow members, comprising an annular housing arranged to be secured to one of the hollow members, means defining an annular recess in said housing, a floating adaptor ring having peripheral projections received in said recess, said ring limited thereby to radial and axial movement relative to said housing, said ring having a pair of radial faces extending perpendicular to the longitudinal axis of the ring, a resilient annular sealing member sealingly secured to the housing, said resilient annular sealing member having a lip portion sealingly engaging the floating ring on one of its radial faces adjacent the outer periphery thereof, and a further resilient annular sealing member sealingly mounted on the other radial face of said ring adjacent the inner periphery thereof, said further resilient annular sealing member having a lip portion to make sealing contact with the other of the hollow members.

2. Sealing means according to claim 1, in which each sealing member is U-shaped and has an initially concave sealing surface.

3. Sealing means according to claim 1, in which the adaptor ring is arranged to be exposed to fluid passing through said housing so as to act like a piston to increase the sealing pressure exerted on said further resilient member.

4. A pipe coupling comprising two pipe sections clamped together in a fluidtight manner by means of a pipe coupling, and sealing means between the two pipe sections, said sealing means comprising an annular housing secured to one of the pipe sections, means defining an annular recess in said housing, a floating adaptor ring having peripheral projections received in said recess, said ring limited thereby to radial and axial movement relative to said housing, said ring having a pair of radial faces extending perpendicular to the longitudinal axis of the ring, a resilient annular sealing member sealingly secured to the housing, said resilient annular sealing member having a lip portion sealingly engaging one radial face of the floating ring, and a further resilient annular sealing member sealingly mounted on the other radial face of said ring, said further annular sealing member having a lip portion making sealing contact with the other pipe section.

5. A pipe coupling according to claim 4, in which the housing is formed integrally with said one pipe section.

6. A pipe coupling according to claim 4, in which each sealing member is U-shaped with an initially concave sealing surface.

7. A pipe coupling according to claim 4, in which the adaptor ring is arranged to be exposed to fluid passing through said housing so as to act like a piston to increase the sealing pressure exerted on said further resilient member.

References Cited

UNITED STATES PATENTS 2,793,883   5/1957   Main ............... 285—349 X
3,567,258   3/1971   Scaramucci ....... 285—349 X DAVE W. AROLA, Primary Examiner U.S. Cl. X.R.

285—90, 101, 108